(12) United States Patent
Sato et al.

(10) Patent No.: US 11,029,860 B2
(45) Date of Patent: Jun. 8, 2021

(54) CONTROL DEVICE, DISPLAY DEVICE, AND METHOD FOR CONTROLLING MEMORY POWER-SAVING STATE

(71) Applicant: SEIKO EPSON CORPORATION, Tokyo (JP)

(72) Inventors: Nozomi Sato, Kitahiroshima (JP); Motoki Ueda, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 13 days.

(21) Appl. No.: 16/540,358

(22) Filed: Aug. 14, 2019

(65) Prior Publication Data

US 2020/0057571 A1 Feb. 20, 2020

(30) Foreign Application Priority Data

Aug. 15, 2018 (JP) .............................. JP2018-152916

(51) Int. Cl.
*G06F 12/00* (2006.01)
*G06F 3/06* (2006.01)
*G06F 13/42* (2006.01)
*G06F 13/00* (2006.01)
*G06F 13/28* (2006.01)

(52) U.S. Cl.
CPC .......... *G06F 3/0625* (2013.01); *G06F 3/0655* (2013.01); *G06F 3/0673* (2013.01); *G06F 13/4221* (2013.01); *G06F 2213/0024* (2013.01)

(58) Field of Classification Search
CPC .. G06F 3/0625; G06F 3/0655; G06F 13/4221; G06F 3/0673; G06F 2213/0024
See application file for complete search history.

(56) References Cited

U.S. PATENT DOCUMENTS

2011/0258354 A1* 10/2011 Wang .................... G06F 13/161
710/114
2015/0066854 A1 3/2015 Yokoi
2017/0251243 A1* 8/2017 Lee ..................... H04N 21/4383

FOREIGN PATENT DOCUMENTS

JP 2011-095967 A 5/2011
JP 2015-046130 A 3/2015

* cited by examiner

*Primary Examiner* — Mark A Giardino, Jr.
(74) *Attorney, Agent, or Firm* — Oliff PLC (57) ABSTRACT

A processor controlling access to a memory includes: a physical layer controller executing data access to the memory; a memory controller accepting an access request to the memory from a plurality of bus masters and causing the physical layer controller to execute the access request; and a CPU. The CPU shifts the memory controller into a busy state to accept the access request and stand by for execution, when a condition to turn the memory into a power-saving state is satisfied. The CPU executes control to turn the memory into the power-saving state, with the memory controller being in the busy state.

7 Claims, 4 Drawing Sheets

CONTROL DEVICE, DISPLAY DEVICE, AND METHOD FOR CONTROLLING MEMORY POWER-SAVING STATE

The present application is based on, and claims priority from JP Application Serial Number 2018-152916, filed Aug. 15, 2018, the disclosure of which is hereby incorporated by reference herein in its entirety.

BACKGROUND

1. Technical Field

The present disclosure relates to a control device, a display device, and a method for controlling a memory.

2. Related Art

According to the related art, a technique for reducing power consumption in an apparatus having a measure for controlling access to a memory from a device is proposed. JP-A-2015-46130 is an example of the related art. The apparatus disclosed in JP-A-2015-46130 reduces power consumption by stopping a memory control clock when an access request to the memory is not generated. This apparatus sends a request mask signal to a bus master and masks an access request from the bus master, thus creating a period when an access request to the memory is not generated.

Another method for stopping an access request to the memory is proposed. JP-A-2011-95967 is an example of this method. JP-A-2011-95967 discloses a technique of stopping an access to the memory by sending a master module a stop instruction signal giving an instruction to stop data transmission.

In this way, in the related-art methods for controlling an access request to the memory, a signal is sent to the bus master and thus changes a function of the bus master.

SUMMARY

An object of the present disclosure is to stop or restrain memory access by a method that does not change a function of the bus master.

An aspect of the present disclosure is directed to a control device controlling access to a memory, including: a memory interface unit executing data access to the memory; a memory controller accepting an access request to the memory from a plurality of bus masters and causing the memory interface unit to execute the access request; and a memory controller management unit. The memory controller management unit shifts the memory controller into an execution standby state to accept the access request and stand by for execution, when a condition to turn the memory into a power-saving state is satisfied. The memory controller management unit causes the memory interface unit to execute control to turn the memory into the power-saving state, with the memory controller being in the execution standby state.

In the control device, the memory controller may execute the access request from the bus masters in a predetermined order. During execution of the access request, the memory controller may be in a busy state of being able to accept another access request and standing by for execution. In the execution standby state, the memory controller may execute an operation of the busy state.

In the control device, the memory controller may include a first data interface accepting the access request from the bus masters and causing the memory interface unit to execute the access request, and a first control interface shifting the first data interface into the execution standby state under control of the memory controller management unit.

In the control device, the memory interface unit may execute access to the memory based on a parameter, and execute control to turn the memory into the power-saving state when the parameter is a parameter for the power-saving state. The memory controller management unit may change the parameter of the memory interface unit to the parameter for the power-saving state after turning the memory controller into the execution standby state.

In the control device, the memory interface unit may include a physical layer interface executing access to the memory based on the parameter, and a second control interface setting the parameter in the physical layer interface under the control of the memory controller management unit.

In the control device, the memory interface unit may execute access to the memory, using correction data acquired by executing calibration. The memory controller management unit may acquire and save the correction data of the memory interface unit before the memory shifts into the power-saving state, and may change the correction data of the memory interface unit. When the memory returns from the power-saving state into a normal operation state, the saved correction data may be set in the memory interface unit.

Another aspect of the present disclosure is directed to a display device including: a memory storing image data; a processor accessing the memory and processing the image data; and a display unit displaying an image based on the image data. The processor includes a data processing unit processing the image data. The processor functions as a control device controlling access to the memory in response to an access request to the memory from the data processing unit. The processor includes: a memory interface unit executing data access to the memory; a memory controller accepting an access request to the memory from the data processing unit and causing the memory interface unit to execute the access request; and a memory controller management unit. The memory controller management unit shifts the memory controller into an execution standby state to accept the access request and stand by for execution, when a condition to turn the memory into a power-saving state is satisfied. The memory controller management unit causes the memory interface unit to execute control to turn the memory into the power-saving state, with the memory controller being in the execution standby state.

Still another aspect of the present disclosure is directed to a method for controlling a memory which a memory interface unit executing data access to the memory, and a memory controller accepting an access request to the memory from a plurality of bus masters and causing the memory interface unit to execute the access request. The method includes: shifting the memory controller into an execution standby state to accept the access request and standby for execution, when a condition to turn the memory into a power-saving state is satisfied; and causing the memory interface unit to execute control to turn the memory into the power-saving state, with the memory controller being in the execution standby state.

In order to achieve the foregoing object, various other forms may be employed than the foregoing control device, display device, and method for controlling a memory. For example, a program executed by a computer or processor to execute the method for controlling a memory may be employed. Also, a recording medium with the program recorded thereon, a server device distributing the program, a transmission medium transmitting the program, a data signal embodying the program in a carrier wave, or the like, may be employed.

DESCRIPTION OF EXEMPLARY EMBODIMENTS

Configuration of Projector

Figure 1:
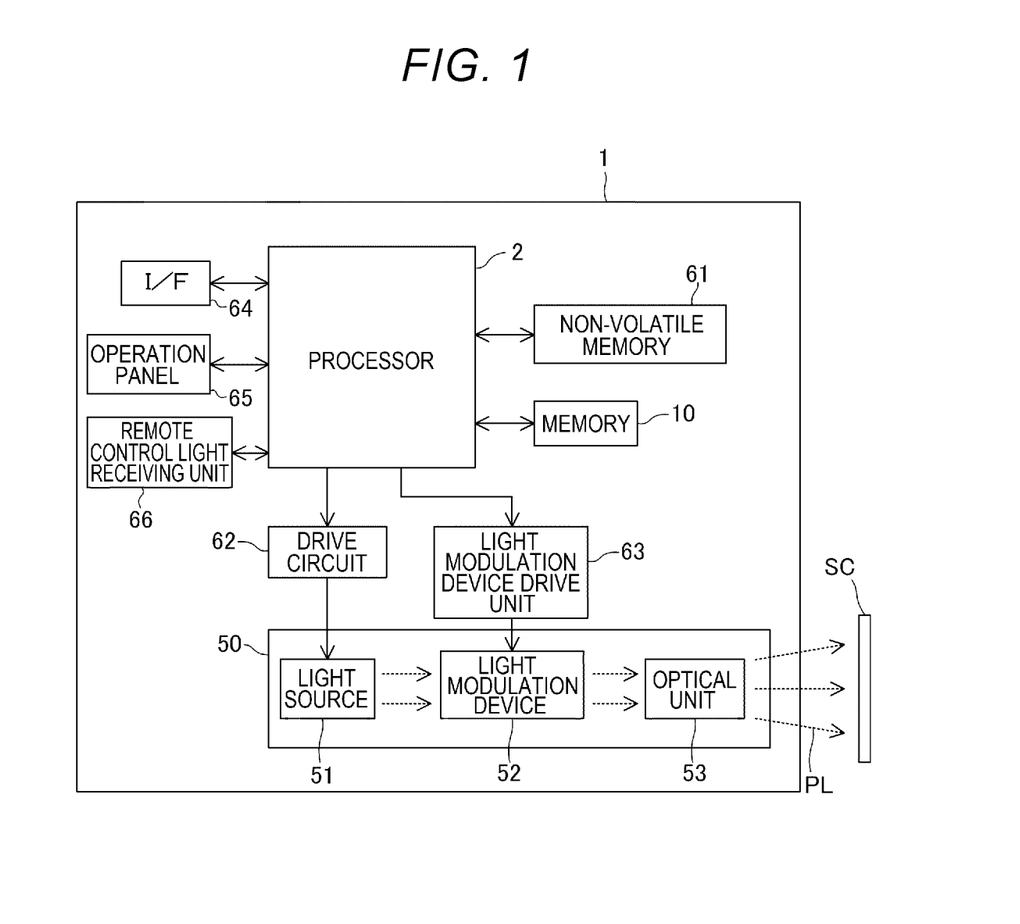
FIG. 1 is a block diagram of a projector.

FIG. 1 is a block diagram showing the configuration of a projector 1.

The projector 1 has a processor 2 and a memory 10. The processor 2 executes data processing using the memory 10 and controls each part of the projector 1. Details of the processor 2 will be described later. The memory 10 has a volatile storage area and is formed of, for example, a DDR SDRAM (double data rate synchronous dynamic random access memory). The processor 2 accesses the memory 10 and executes data processing. The processor 2 also has a function to control access to the memory 10 and functions as a control device.

The projector 1 has a projection unit 50 forming image light PL and projecting the image light PL onto a screen SC. A drive circuit 62 driving the projection unit 50, and a light modulation device drive unit 63, are coupled to the projection unit 50. The drive circuit 62 and the light modulation device drive unit 63 are coupled to the processor 2 and operate under the control of the processor 2. The projection unit 50 is equivalent to a display unit.

The projection unit 50 has alight source 51, alight modulation device 52, and an optical unit 53.

The light source 51 is formed of a lamp or solid-state light source and emits light based on electric power supplied from the drive circuit 62. For example, a halogen lamp, xenon lamp, ultra-high-pressure mercury lamp or the like can be used as the light source 51. The light source 51 may also be a solid-state light source such as an LED (light-emitting diode) or laser light source.

The drive circuit 62 supplies a drive current or pulse to the light source 51 under the control of the processor 2.

The light modulation device 52 modulates light emitted from the light source 51, thus generates image light PL, and casts the image light PL onto the optical unit 53.

The light modulation device 52 has a light modulation element such as a transmission-type liquid crystal light valve, reflection-type liquid crystal light valve, or digital mirror device. The light modulation device drive unit 63 is coupled to the light modulation element of the light modulation device 52. The light modulation device drive unit 63 drives the light modulation device 52 under the control of the processor 2 and draws an image, frame by frame, on the light modulation element. For example, when the light modulation device 52 is formed of a liquid crystal light valve, the light modulation device drive unit 63 is a liquid crystal driver circuit.

The optical unit 53 has an optical element such as a lens or mirror and projects the image light PL modulated by the light modulation device 52 toward the screen SC.

The projector 1 has a non-volatile memory 61. The non-volatile memory 61 is formed of, for example, a flash memory, EEPROM (electrically erasable programmable read-only memory) or the like. The non-volatile memory 61 stores various data processed by the processor 2, in a non-volatile manner. For example, the non-volatile memory 61 stores a set value about image processing or control processing to control the projection unit 50, or the like. The non-volatile memory 61 may also store image data that serves as a source of an image projected by the projector 1 via the projection unit 50. In this case, the processor 2 reads out the image data from the non-volatile memory 61, executes image processing, and causes the projection unit 50 to project an image.

FIG. 1 shows a configuration where the projector 1 has an interface 64, an operation panel 65, and a remote control light receiving unit 66, as an example.

The interface 64 is a wired or wireless interface coupling an external device to the projector 1. The interface 64 may also be formed of a wireless communication interface. In this case, the interface 64 can be a communication module including an antenna, an RF circuit, a baseband circuit and the like. The interface 64 executes wireless communication, for example, based on Bluetooth (trademark registered), wireless LAN including Wi-Fi (trademark registered), NFC (near field communication) or the like.

In the illustration, the interface 64 is abbreviated as "I/F". Similarly, in the illustrations referred to in the description below, a non-volatile memory interface 17, described later, is abbreviated as "non-volatile I/F". A first data interface 32 is abbreviated as "first data I/F". A first control interface 34 is abbreviated as "first control I/F". A second data interface 36 is abbreviated as "second data I/F". A physical layer interface 37 is abbreviated as "physical layer I/F". A second control interface 38 is abbreviated as "second control I/F". Also, a physical layer controller 35 is abbreviated as "PHY".

The interface 64 can also be an interface to which image data is inputted. In this case, the interface 64 has a connector, and an interface circuit receiving image data via a cable, not illustrated, coupled to the connector. For example, the interface 64 may be configured in conformity with an image data transmission standard such as HDMI (high-definition multimedia interface). HDMI is a registered trademark.

The interface 64 may also be configured as a communication interface communicating with an external device. In this case, the interface 64 has a connector, and an interface circuit sending and receiving data via the connector. For example, the interface 64 may be configured as a circuit executing data communication, for example, based on Ethernet (trademark registered), IEEE 1394, USB (universal serial bus) or the like.

For example, an image supply device supplying image data can be coupled to the interface 64. Specifically, the interface 64 can be configured in such a way that a notebook PC (personal computer), desktop PC, tablet terminal, smartphone, PDA (personal digital assistant) or the like can be coupled thereto. The interface 64 may also be configured in such a way that a video playback device, DVD (digital versatile disk) player, Blu-ray disc player or the like can be coupled thereto. The interface 64 may also be configured in such a way that a hard disk recorder, television tuner device, CATV (cable television) set-top box, video game machine or the like can be coupled thereto.

The device coupled to the interface 64 is not limited to a device having a data processing function. For example, the interface 64 may be configured in such a way that a device such as a USB memory device or input device can be coupled thereto.

The operation panel 65 is arranged, for example, at the casing of the projector 1 and has various switches. When a switch of the operation panel 65 is operated, an operation signal corresponding to the operated switch is inputted to the processor 2.

The remote control light receiving unit 66 receives an infrared signal sent from a remote controller, not illustrated, and decodes the received signal. The remote control light receiving unit 66 outputs the decoded data of the received signal to the processor 2.

The processor 2 executes control on the projector 1 and data processing on an image projected by the projection unit 50. The processor 2 selects an image source of an image to be projected. In this embodiment, the processor 2 selects an image source from image data inputted to the interface 64 or image data stored in the non-volatile memory 61. The processor 2 acquires image data from the selected image source and performs image processing.

The processor 2 loads an image based on the image data acquired from the image source, frame by frame into the memory 10, and executes various kinds of processing on the image loaded in the memory 10. The processor 2 executes, for example, resolution conversion to covert the resolution of the image data according to the display resolution of the light modulation device 52. The processor 2 also executes frame rate conversion to convert the frame rate of the image source to a frame rate at which the image loaded in the memory 10 is drawn in the light modulation device 52. The processor 2 may also execute geometric correction to correct a keystone distortion or pincushion distortion of the image projected onto the screen SC by the projection unit 50. The processor 2 may also execute color tone correction to correct the color tone of the image data or may execute OSD (on-screen display) processing to superimpose and combine another image with the image loaded in the memory 10 based on the image source. The processor 2 may also execute other types of processing. The processor 2 generates an image signal to display the processed image and outputs the image signal to the light modulation device drive unit 63.

Configuration of Processor

Figure 2:
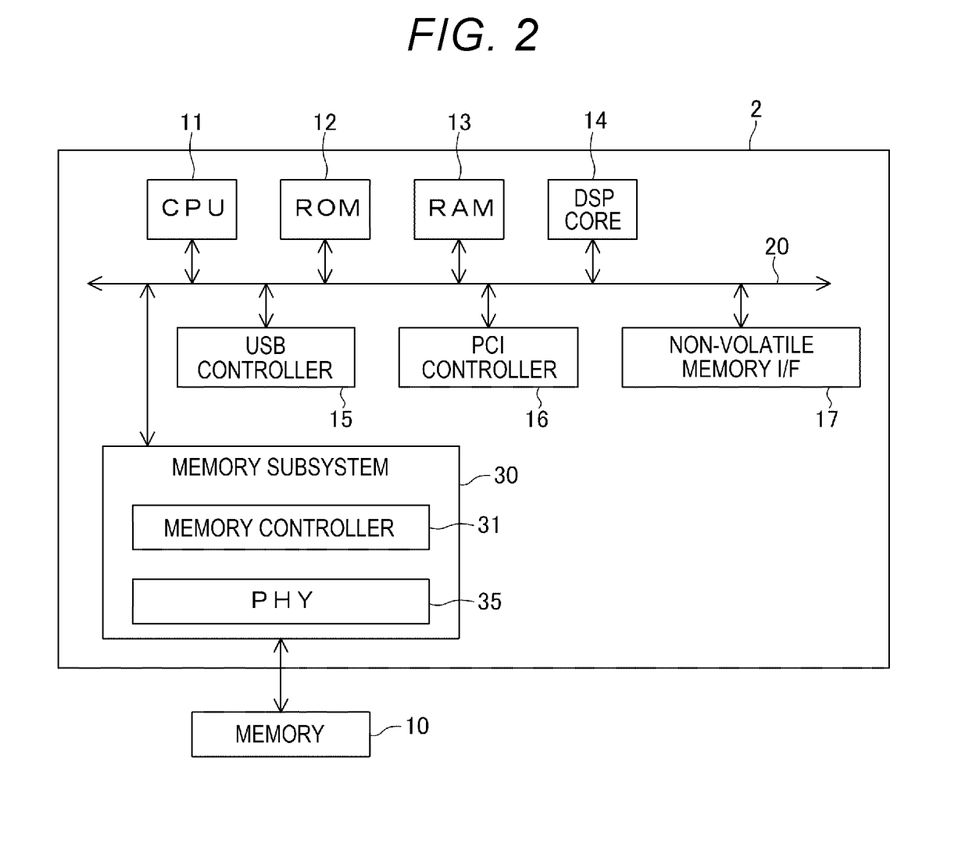
FIG. 2 is a block diagram of a processor.

FIG. 2 is a block diagram showing the configuration of the processor 2.

The processor 2 is an integrated chip formed of one or a plurality of processor cores and a memory integrated together. For example, an SoC (system on a chip) is employed. The processor 2 in this embodiment has a CPU (central processing unit) 11, a ROM 12, and a RAM 13.

In the example of FIG. 2, the processor 2 has a DSP (digital signal processing) core 14. The processor 2 also has a USB controller 15, a PCI (peripheral component interconnect) controller 16, and a non-volatile memory interface 17. These are installed as an IP (intellectual property) core in the processor 2. The same applies to the CPU 11, the ROM 12, and the RAM 13.

The configuration of FIG. 2 is an example. The DSP core 14, the USB controller 15, the PCI controller 16, and the non-volatile memory interface 17 are not essential components of the processor 2. The processor 2 can also be equipped with an IP core other than the functional blocks shown in FIG. 2. For example, the processor 2 may be equipped with an audio codec. The processor 2 may also be equipped with an amplifier, an A/D converter, a D/A converter, a power-supply circuit, a sensor or the like. The functional blocks installed in the processor 2 may be an analog circuit or a digital circuit.

The CPU 11 executes a control program stored in the ROM 12 and thus executes control on each part of the processor 2 and control on the projector 1. The ROM 12 stores the control program executed by the CPU 11 and various data processed by the CPU 11, in a non-volatile manner. The RAM 13 forms a work area and temporarily stores data processed by the CPU 11.

The DSP core 14 executes image processing and processes image data projected by the projection unit 50. The DSP core 14 executes the foregoing resolution conversion, frame rate conversion, geometric correction, color tone correction, OSD processing or the like. The processing executed by the DSP core 14 is not limited to these types of processing. The DSP core 14 is equivalent to a data processing unit.

The USB controller 15 controls communication with a device coupled to a USB connector provided in the interface 64.

The PCI controller 16 controls communication via a PCI bus coupling a peripheral device to the processor 2 within the projector 1. For example, the operation panel 65 and the remote control light receiving unit 66 are coupled to the processor 2 via the PCI bus. Also, the drive circuit 62 and the light modulation device drive unit 63 may be coupled to the processor 2 via the PCI bus.

The non-volatile memory interface 17 is coupled to the non-volatile memory 61 and controls writing of data to the non-volatile memory 61, deletion of data, and reading of data from the non-volatile memory 61 by the processor 2.

The processor 2 has a memory subsystem 30. The memory subsystem 30 is coupled to the memory 10 and controls access from each part of the processor 2 to write data to, read data from, and delete data from the memory 10. Specifically, the memory subsystem 30 controls access to the memory 10 from each of the CPU 11, the DSP core 14, the USB controller 15, the PCI controller 16, and the non-volatile memory interface 17.

The memory subsystem 30 has a memory controller 31 controlling access from each part of the processor 2, and a physical layer controller 35 executing access to the memory 10.

Memory Access Control

Figure 3:
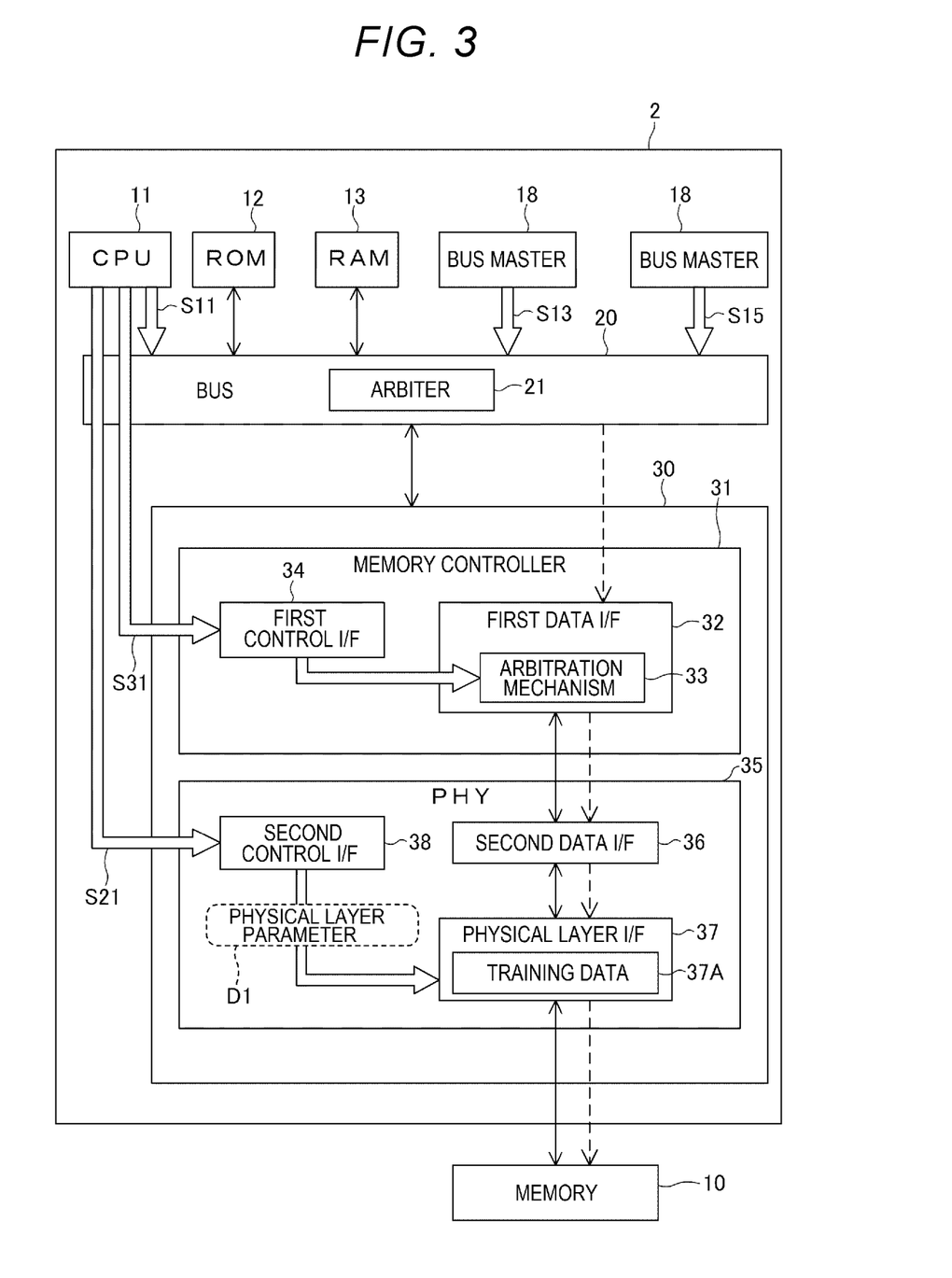
FIG. 3 is a block diagram of the processor.
Figure 4:
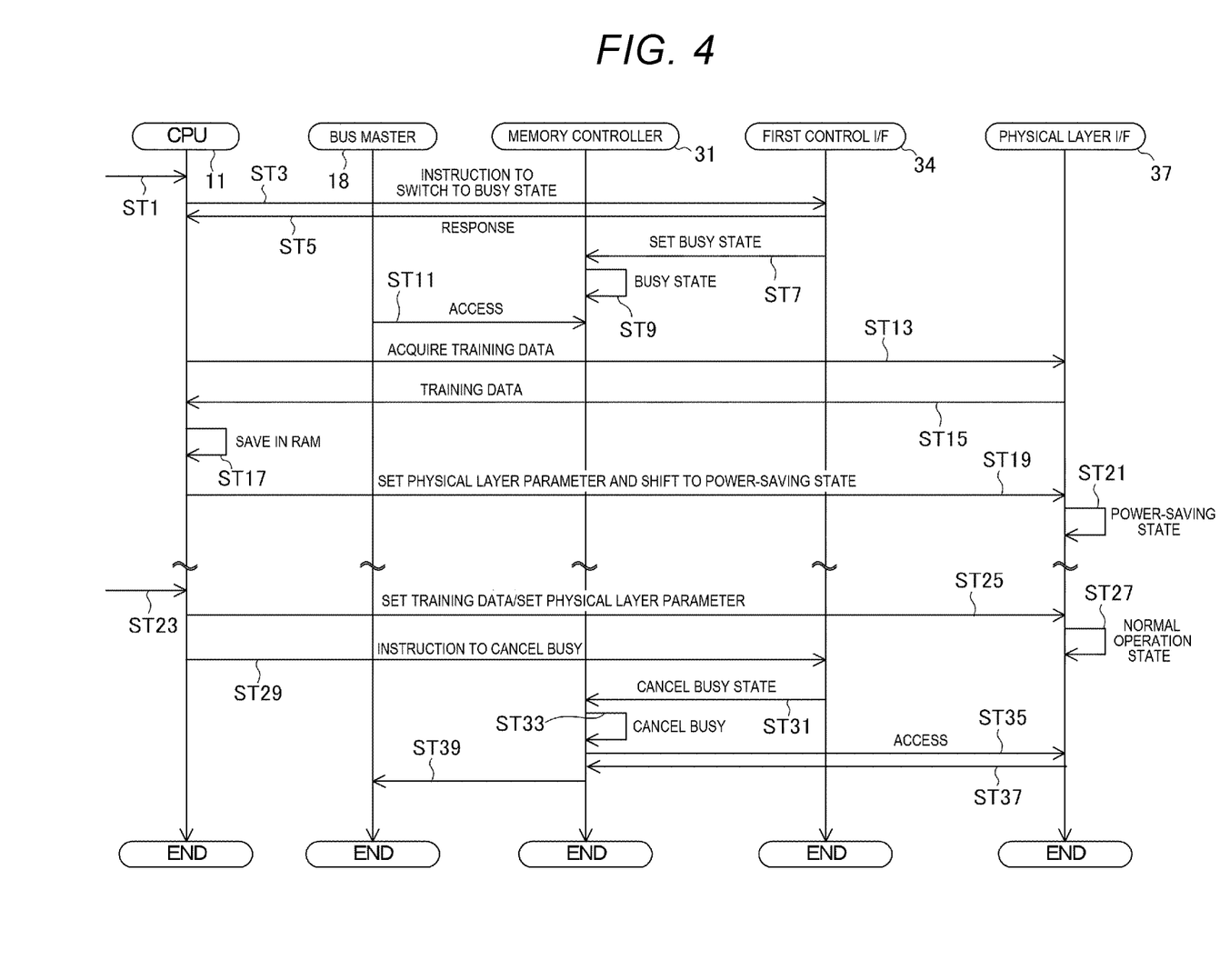
FIG. 4 is a sequence chart showing an operation of the processor.

FIG. 3 is a block diagram of the processor 2, showing details of the configuration of the memory subsystem 30. FIG. 4 is a sequence chart showing an access control function to the memory 10, of the processor 2.

In FIG. 3, a control block accessing the memory 10 is illustrated as a bus master 18, in addition to the CPU 11. The bus master 18 refers to a device accessing the memory 10 as a host and having a DMAC (direct memory access controller). The bus master 18 includes, for example, the DSP core 14, the USB controller 15, and the PCI controller 16 shown in FIG. 2. The processor 2 may also have another processor core as a bus master 18.

In the processor 2, I/O access S11 from the CPU 11 to the memory 10, and access requests S13, S15 from the respective bus masters 18 to the memory 10 are generated.

A bus 20 has an arbiter 21. The arbiter 21 arbitrates bus rights of the CPU 11 and the bus masters 18 and causes access to be sequentially executed so that the accesses S11, S13, S15 from the CPU 11 and the bus masters 18 will not conflict with each other.

The arbiter 21 may be hardware such as a bus controller coupled to the bus 20 or may be implemented by the CPU 11 or another processor executing a program.

The memory subsystem 30 is formed of the memory controller 31 and the physical layer controller 35 as described above.

The memory controller 31 has a first data interface 32. The first data interface 32 has an arbitration mechanism 33 and arbitrates, by the arbitration mechanism 33, requests from the bus masters 18 inputted via the bus 20. The first data interface 32 sequentially processes the access requests S13, S15 from the bus masters 18 by the arbitration mechanism 33 and accesses the physical layer controller 35. The physical layer controller 35 executes data access to the memory 10 and functions as a memory interface unit.

The physical layer controller 35 has a second data interface 36 and a physical layer interface 37. The second data interface 36 is an interface accepting access from the memory controller 31. The physical layer interface 37 is coupled to the memory 10 and executes the access accepted by the second data interface 36. The result of access processing to the memory 10 by the physical layer interface 37 and data or the like read out from the memory 10 are outputted to the second data interface 36. The data or the like is outputted to the bus master 18 from the second data interface 36 via the first data interface 32.

Training data 37A is set in the physical layer interface 37. The training data 37A is data obtained by executing a calibration sequence. The physical layer interface 37 executes access adjusted based on the training data 37A and therefore can reduce the influence of variation due to the process, voltage, and temperature of the memory 10. This can enhance the coupling between the memory subsystem 30 and the memory 10. The training data 37A is equivalent to correction data.

The CPU 11 controls the memory controller 31 and the physical layer controller 35 of the processor 2 to execute access control to the memory 10, as described later. The CPU 11 functions as a memory controller management unit.

The physical layer controller 35 has a second control interface 38 coupled to the physical layer interface 37. The second control interface 38 is coupled to the CPU 11 and can execute processing to set a physical layer parameter D1 in the physical layer interface 37 in response to a command S21 sent from the CPU 11. The physical layer parameter D1 is a parameter setting an operation state of the physical layer interface 37.

In this embodiment, under the control of the CPU 11, the physical layer controller 35 can execute a power-saving state to restrain power consumption by the memory 10. The power-saving state is a state where the power consumption by the memory 10 is lower than in a normal operation state. In the power-saving state, the supply of a clock to the memory 10 and the supply of power to a part or the entirety of a bank of the memory 10 or the like are stopped.

As the second control interface 38 sets the physical layer parameter D1 in the physical layer interface 37, the operation of the physical layer interface 37 can be switched. That is, when the physical layer parameter D1 for the power-saving state is set in the physical layer interface 37, the physical layer interface 37 shifts the memory 10 into the power-saving state. When the physical layer parameter D1 for a normal operation is set in the physical layer interface 37, the physical layer interface 37 causes the memory 10 to execute the normal operation. The normal operation refers to an operation state where the physical layer interface 37 accesses the memory 10 in response to the access requests S13, S15 from the bus masters 18.

The CPU 11 controls the second control interface 38 to execute processing to set the physical layer parameter D1 for the power-saving state and processing to set the physical layer parameter D1 for the normal operation, in the physical layer interface 37.

The physical layer parameter D1 for the power-saving state and the physical layer parameter D1 for the normal operation are stored in advance in the ROM 12. When shifting the memory 10 from the normal operation state into the power-saving state, the CPU 11 reads out the physical layer parameter D1 for the power-saving state from the ROM 12. The CPU 11 sends the command S21 designating a setting and the physical layer parameter D1 to the second control interface 38 and causes the second control interface 38 to set the physical layer parameter D1. Meanwhile, when returning the memory 10 from the power-saving state into the normal operation state, the CPU 11 reads out the physical layer parameter D1 for the normal operation state from the ROM 12. The CPU 11 sends the command S21 designating a setting and the physical layer parameter D1 to the second control interface 38 and causes the second control interface 38 to set the physical layer parameter D1.

The training data 37A provided in the physical layer interface 37 is data setting an operation of the physical layer interface 37 in the normal operation state. In the power-saving state, the physical layer interface 37 does not execute an operation based on the training data 37A. Therefore, when the memory 10 shifts into the power-saving state, it is preferable that the training data 37A is replaced with data for the power-saving state. In this case, when the memory 10 returns from the power-saving state into the normal operation state, it is preferable that the physical layer interface 37 is turned into the state of operating according to the training data 37A.

When shifting the memory 10 from the normal operation state into the power-saving state, the CPU 11 acquires the training data 37A from the physical layer interface 37. Specifically, the CPU 11 sends the command S21 giving an instruction to acquire the training data 37A, to the second control interface 38. In response to the command S21 from the CPU 11, the second control interface 38 acquires the training data 37A from the physical layer interface 37 and sends the training data 37A to the CPU 11. The CPU 11 temporarily stores, in the RAM 13, the training data 37A sent from the second control interface 38.

When returning the memory 10 from the power-saving state into the normal operation state, the CPU 11 reads out the training data 37A from the RAM 13. The CPU 11 sends the command S21 giving an instruction to set the training data 37A and the training data 37A read out from the RAM 13, to the second control interface 38. In response to the command S21 from the CPU 11, the second control interface 38 sets the training data 37A in the physical layer interface 37. Thus, the physical layer interface 37 can execute the operation in the normal operation state, based on the training data 37A. That the CPU 11 temporarily holds the training data 37A in the RAM 13 is advantageous in that the physical layer interface 37, when shifting into the normal operation state, can quickly return into the normal operation state without having to redo calibration and training.

The processing to shift the memory 10 into the power-saving state needs to be executed while there is no access to the memory 10 from the memory subsystem 30. Setting the physical layer parameter D1 in the physical layer interface 37 or changing the training data 37A during the execution of access to the memory 10 may result in failure to access the memory 10 and generation of an operation error in the processor 2. However, when a method of waiting until there is no longer any access to the memory 10 and then shifting into the power-saving state is employed, there is a concern over a longer time taken to shift into the power-saving state.

Thus, when shifting the memory 10 into the power-saving state, the CPU 11 executes control so as not to generate access to the memory 10.

The memory controller 31 has a first control interface 34 controlling the first data interface 32. The first control interface 34 has a function of setting the first data interface 32 into a busy state under the control of the CPU 11.

When the access requests S13, S15 from the bus masters 18 are generated, the arbitration mechanism 33 decides an order in which the respective access request S13, S15 are executed, and carries out access to the physical layer controller 35 corresponding to the access request S13, S15 in the decided order. During the execution of an operation based on one of the access requests S13, S15, the arbitration mechanism 33 is in a busy state to the other access request. In the busy state, the arbitration mechanism 33 carries out processing to accept an access request, but does not execute the access request and causes the access request to wait. Therefore, the bus master 18 sending the access request is made to wait because the bus 20 is in the busy state. These are normal access control functions of the bus master 18 and the first data interface 32.

The CPU 11 sends a command S31 giving an instruction to switch to the busy state, to the first control interface 34. In this case, the first control interface 34 switches the arbitration mechanism 33 into the busy state. Thus, the arbitration mechanism 33 maintains the busy state even when the access requests S13, S15 are not generated. In this state, even when the bus masters 18 send the access requests S13, S15, the access requests S13, S15 are accepted by the arbitration mechanism 33 but not executed, similarly to when the bus 20 is in the busy state. Therefore, the bus masters 18 wait.

Thus, as the CPU 11 performs control to switch the arbitration mechanism 33 into the busy state, the state where the memory controller 31 does not access the memory 10 can be created temporarily. Therefore, the memory 10 can be shifted into the power-saving state.

When returning the memory 10 from the power-saving state into the normal operation state, the CPU 11 sends the command S31 giving an instruction to end the busy state, to the first control interface 34. In this case, the first control interface 34 switches the arbitration mechanism 33 from the busy state into the normal operation state. Thus, the arbitration mechanism 33 returns from the busy state and sequentially processes the access requests S13, S15 accepted while being in the busy state.

The foregoing operation sequence will now be described with reference to the sequence chart of FIG. 4. In the operation described below, a trigger for shifting the memory 10 into the power-saving state and a trigger for returning the memory 10 from the power-saving state into the normal operation state are inputted to the CPU 11. These triggers may be data inputted from the interface 64, or a signal or the like inputted from the operation panel 65 or the remote control light receiving unit 66. Also, when the processor 2 has an RTC (real-time clock) measuring the current time and shifts into the power-saving state and returns into the normal operation state at scheduled time, a trigger to the CPU 11 may be generated based on the output of the RTC. The generation of a trigger for shifting the memory 10 into the power-saving state is equivalent to that a condition to shift the memory 10 into the power-saving state is satisfied.

When a trigger for shifting into the power-saving state is generated (step ST1), the CPU 11 sends the command S31 to the first control interface 34 and gives an instruction to switch to the busy state (step ST3).

The first control interface 34 sends a response to the command S31 sent from the CPU 11 (step ST5). The first control interface 34 sets the arbitration mechanism 33 of the memory controller 31 into the busy state (step ST7). Thus, the first data interface 32 turns into the busy state (step ST9).

When an access request is generated from the bus master 18 after step ST9 (step ST11), this access request is accepted by the memory controller 31 but waits without being executed.

The CPU 11 sends the command S21 giving an instruction to acquire the training data 37A, to the second control interface 38 (step ST13). In response to this command, the second control interface 38 acquires the training data 37A from the physical layer interface 37, and the training data 37A is sent to the CPU 11 (step ST15). The CPU 11 saves the training data 37A received in step ST15, in the RAM 13 (step ST17).

The CPU 11 reads out the physical layer parameter D1 used in the power-saving state from the ROM 12 and sends the physical layer parameter D1 with the command S21 giving an instruction to set, to the second control interface 38 (step ST19). When the second control interface 38 sets the physical layer parameter D1 in the physical layer interface 37 in response to the command S21, the physical layer interface 37 and the memory 10 shift into the power-saving state (step ST21).

When a trigger for returning from the power-saving state is generated (step ST23), the CPU 11 reads out the physical layer parameter D1 used in the normal operation state from the ROM 12. The CPU 11 reads out the training data 37A saved in the RAM 13. The CPU 11 sends the physical layer parameter D1, the training data 37A, and the command S21 giving an instruction to set, to the second control interface 38 (step ST25).

Thus, the physical layer interface 37 returns the memory 10 from the power-saving state into the normal operation state (step ST27) and starts the operation based on the training data 37A.

The CPU 11 sends the command S31 to the first control interface 34 and gives an instruction to end the busy state (step ST29). The first control interface 34 cancels the busy state of the memory controller 31 in response to the command S31 (step ST31). The first data interface 32 is enabled to process an access request (step ST33).

The first data interface 32 executes an access request accepted after shifting into the busy state in step ST9 (step ST35). For example, the access request generated in step ST11 is executed in step ST35. The physical layer interface 37 accesses the memory 10 in response to the access request and returns the result of the execution to the memory controller 31 (step ST37). Thus, the result of access is returned to the bus master 18 sending the access request (step ST39).

As described above, the processor 2 functions as a control device controlling access to the memory 10 and has the CPU 11. The processor 2 has the physical layer controller 35 executing data access to the memory 10. The processor 2 has the memory controller 31 accepting an access request to the memory 10 from a plurality of bus masters 18 and causing the physical layer controller 35 to execute the access request. When a condition to turn the memory 10 into the power-saving state is satisfied, the CPU 11 shifts the memory controller 31 into the busy state as an execution standby state to accept an access request and stand by for execution, and causes the physical layer controller 35 to execute control to turn the memory 10 into the power-saving state, with the memory controller 31 being in the busy state. The condition to turn the memory 10 into the power-saving state is, for example, the generation of a trigger for shifting into the power-saving state (step ST1).

The processor 2, to which the control device and the method for controlling a memory according to the present disclosure are applied, can stop access to the memory 10 based on an access request from the bus master 18 and shift the memory 10 into the power-saving state. Therefore, access to the memory 10 can be stopped or restrained by a method that does not change the function of the bus master 18, and the occurrence of an error in shifting the memory 10 into the power-saving state can be prevented or restrained.

The CPU 11 can temporarily create the state where there is no access to the memory 10, using the function of the busy state normally provided in the bus master 18 and the memory controller 31. Thus, the power-saving function of the memory 10 can be implemented by forming the state where there is no access to the memory 10 by an easily achievable method.

Since the CPU 11 temporarily creates the state where there is no access to the memory 10, using the function of the busy state, there is no need to control the bus master 18 to stop an access request. There is no need to install a new function to block an access request in the memory controller 31, either. Recently, integrated processors such as Soc, ASIC (application-specific integrated circuit), or FPGA (field-programmable gate array) are used extensively. As the number and types of IP cores installed in these integrated processors tend to increase, it is not easy to manage all the functions of the IP cores operating as bus masters. In this respect, the processor 2 equipped with the bus master 18 for processing image data in the projector 1 is no exception.

For example, when stopping an access request from the bus master 18 by the method in which the CPU 11 sends a command to the bus master 18, as in the related-art technique, it is not easy to check whether such a command is loaded in the bus master 18 or not. Therefore, when there are many types or a large number of bus masters 18, the related-art technique cannot necessarily be executed securely and this leaves a concern over practicality.

In contrast, the technique described in this embodiment can temporarily stop access to the memory 10 while letting the bus master 18 operate according to its specifications and without affecting the function of the bus master 18. Therefore, the configuration in this embodiment can be easily applied to an IP core operating as the bus master configured to cope with the busy state of the memory controller 31. Thus, the processor 2 can achieve power-saving of the memory 10 by a highly versatile method that is broadly applicable to an integrated processor equipped with the bus master 18.

The projector 1 having the processor 2 has the memory 10 storing image data, the processor 2 accessing the memory 10 and processing the image data, and the projection unit 50 displaying an image based on the image data. The processor 2 has the DSP core 14 processing the image data and functions as a control device controlling access to the memory 10 in response to an access request to the memory 10 from the DSP core 14. The processor 2 has the CPU 11, and the physical layer controller 35 executing data access to the memory 10. The processor 2 has the memory controller 31 accepting an access request to the memory 10 from the DSP core 14 and causing the physical layer controller 35 to execute the access request. The CPU 11 shifts the memory controller 31 into the execution standby state to accept an access request and stand by for execution, and causes the physical layer controller 35 to execute control to turn the memory 10 into the power-saving state, with the memory controller 31 being in the execution standby state.

The projector 1, to which the display device according to the present disclosure is applied, can control access to the memory 10 from the processor 2 processing image data and shift the memory 10 into the power-saving state, when projecting an image based on image data. Thus, the power-saving function of the memory 10 can be used and therefore the power consumption by the projector 1 can be reduced.

The memory controller 31 executes access requests from the bus masters 18 in a predetermined order. During the execution of an access request, the memory controller 31 is in the busy state of being able to accept an access request and standing by for execution. The memory controller 31 executes the operation in the busy state under the control of the CPU 11. In this way, the CPU 11 can temporarily stop access to the memory 10, using the busy state which the memory controller 31 has for access arbitration. Thus, a versatile method for controlling the memory 10 that is applicable to an integrated processor controlling access to the memory 10 can be provided.

The memory controller 31 has the first data interface 32 accepting an access request from the bus master 18 and causing the physical layer controller 35 to execute the access request. The memory controller 31 has the first control interface 34 shifting the first data interface 32 into the busy state under the control of the CPU 11. Therefore, the first data interface 32 can be shifted into the busy state under the control of the CPU 11 without obstructing the operation of the first data interface 32.

The physical layer controller 35 executes access to the memory 10, based on the physical layer parameter D1. When the physical layer parameter D1 is the physical layer parameter D1 for the power-saving state, the physical layer controller 35 turns the memory 10 into the power-saving state. The CPU 11 turns the memory controller 31 into the busy state and subsequently changes the physical layer parameter D1 of the physical layer controller 35 to the physical layer parameter D1 for the power-saving state. Thus, as the CPU 11 controls the physical layer controller 35, the memory 10 can be quickly shifted into the power-saving state. Also, since the CPU 11 controls the physical layer controller 35, the memory 10 can be shifted into the power-saving state without any problem even when the memory controller 31 is in the busy state.

The physical layer controller 35 has the physical layer interface 37 executing access to the memory 10, based on the physical layer parameter D1. The physical layer controller 35 has the second control interface 38 setting the physical layer parameter D1 in the physical layer interface 37 under the control of the CPU 11. Therefore, the physical layer parameter D1 can be set in the physical layer interface 37 under the control of the CPU 11 without obstructing the operation of the physical layer interface 37 coupled to the memory 10.

The physical layer controller 35 executes access to the memory 10, using the training data 37A obtained by executing calibration. The CPU 11 acquires the training data 37A of the physical layer controller 35 and saves the training data 37A in the RAM 13, before the memory shifts into the power-saving state. The CPU 11 changes the correction data of the physical layer controller 35 after saving the training data 37A. When returning the memory 10 from the power-saving state into the normal operation state, the CPU 11 sets the training data 37A saved in the RAM 13, in the physical layer controller 35. Therefore, when returning the memory 10 from the power-saving state into the normal operation state, appropriate training data 37A can be set in the physical layer interface 37. Also, since training and calibration for the physical layer interface 37 can be omitted, the processing to return the memory 10 from the power-saving state into the normal operation state can be quickly completed.

The foregoing embodiment is simply an example of a specific form to which the present disclosure is applied. The embodiment should not limit the present disclosure. The present disclosure can also be applied in a different form.

For example, in the embodiment, a configuration example where the present disclosure is applied to the processor 2 controlling the projector 1 and executing image processing is described. The present disclosure is not limited to this and can be broadly applied to a processor in which a device operating as a bus master is installed and which has an access control function to a memory such as a DDR or SDRAM. Specifically, the function of the bus master is not limited to the function of the DSP core 14, the USB controller 15, the PCI controller 16 or the like. The component unit controlling access to the memory 10 may not be installed as the memory subsystem 30. For example, the CPU 11 may execute the function of the memory subsystem 30 as software.

In the embodiment, the projector 1 is described as an example of the display device. However, the display device according to the present disclosure may be a liquid crystal display. Also, a display device having a plasma display panel or organic EL panel may be employed.

At least a part of the functional blocks shown in FIGS. 1 to 3 may be implemented by hardware or may be implemented by a collaboration of hardware and software. The functional blocks are not limited to the configuration where separate hardware resources are arranged as illustrated. A configuration having a functional unit other than those illustrated may be employed.

What is claimed is:

1. A control device controlling access to a memory, the control device comprising:
a memory interface unit executing data access to the memory;
a memory controller accepting an access request to the memory from a plurality of bus masters and causing the memory interface unit to execute the access request; and
a memory controller management unit, wherein
the memory controller management unit shifts the memory controller into an execution standby state to accept the access request and stand by for execution, when a condition to turn the memory into a power-saving state is satisfied,
the memory controller management unit causes the memory interface unit to execute control to turn the memory into the power-saving state, with the memory controller being in the execution standby state,
the memory interface unit executes access to the memory, using correction data acquired by executing calibration,
the memory controller management unit acquires and saves the correction data of the memory interface unit before the memory shifts into the power-saving state, and changes the correction data of the memory interface unit, and
when the memory returns from the power-saving state into a normal operation state, the saved correction data is set in the memory interface unit.

2. The control device according to claim 1, wherein
the memory controller executes the access request from the bus masters in a predetermined order, and during execution of the access request, the memory controller is in a busy state of being able to accept another access request and standing by for execution, and in the execution standby state, the memory controller executes an operation of the busy state.

3. The control device according to claim 1, wherein
the memory controller includes:
a first data interface accepting the access request from the bus masters and causing the memory interface unit to execute the access request; and
a first control interface shifting the first data interface into the execution standby state under control of the memory controller management unit.

4. The control device according to claim 1, wherein
the memory interface unit executes access to the memory based on a parameter, and executes control to turn the memory into the power-saving state when the parameter is a parameter for the power-saving state, and
the memory controller management unit changes the parameter of the memory interface unit to the parameter for the power-saving state after turning the memory controller into the execution standby state.

5. The control device according to claim 4, wherein
the memory interface unit includes:
a physical layer interface executing access to the memory based on the parameter; and
a second control interface setting the parameter in the physical layer interface under control of the memory controller management unit.

6. A display device comprising:
a memory storing image data;
a processor accessing the memory and processing the image data; and
a display unit displaying an image based on the image data, wherein
the processor includes a data processing unit processing the image data,
the processor functions as a control device controlling access to the memory in response to an access request to the memory from the data processing unit,
the processor includes:
a memory interface unit executing data access to the memory;
a memory controller accepting an access request to the memory from the data processing unit and causing the memory interface unit to execute the access request; and
a memory controller management unit, wherein
the memory controller management unit shifts the memory controller into an execution standby state to accept the access request and stand by for execution, when a condition to turn the memory into a power-saving state is satisfied,
the memory controller management unit causes the memory interface unit to execute control to turn the memory into the power-saving state, with the memory controller being in the execution standby state,
the memory interface unit executes access to the memory, using correction data acquired by executing calibration,
the memory controller management unit acquires and saves the correction data of the memory interface unit before the memory shifts into the power-saving state, and changes the correction data of the memory interface unit, and when the memory returns from the power-saving state into a normal operation state, the saved correction data is set in the memory interface unit.

7. A method for controlling a memory, using a memory interface unit executing data access to the memory, and a memory controller accepting an access request to the memory from a plurality of bus masters and causing the memory interface unit to execute the access request, the method comprising:

shifting the memory controller into an execution standby state to accept the access request and stand by for execution, when a condition to turn the memory into a power-saving state is satisfied;

causing the memory interface unit to execute control to turn the memory into the power-saving state, with the memory controller being in the execution standby state;

executing access to the memory, using correction data acquired by executing calibration;

acquiring and saving the correction data before the memory shifts into the power-saving state, and changes the correction data; and when the memory returns from the power-saving state into a normal operation state, setting the saved correction data in the memory interface unit.

* * * * *